March 15, 1955 R. W. WILSON 2,704,015
PLOW POINT PITCH CONTROL
Filed April 3, 1953
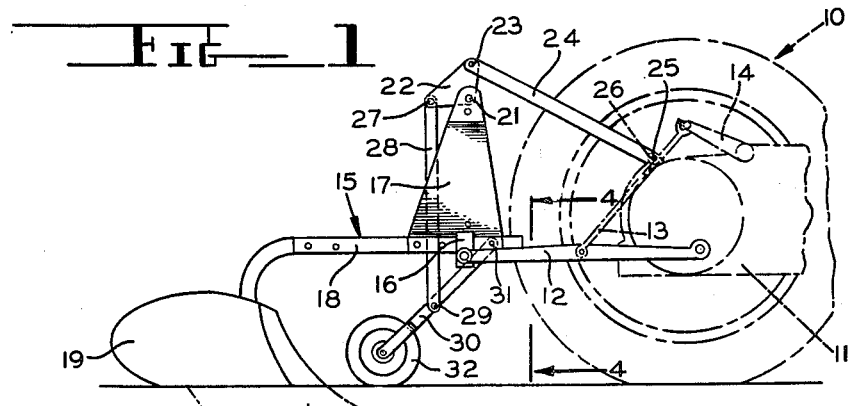
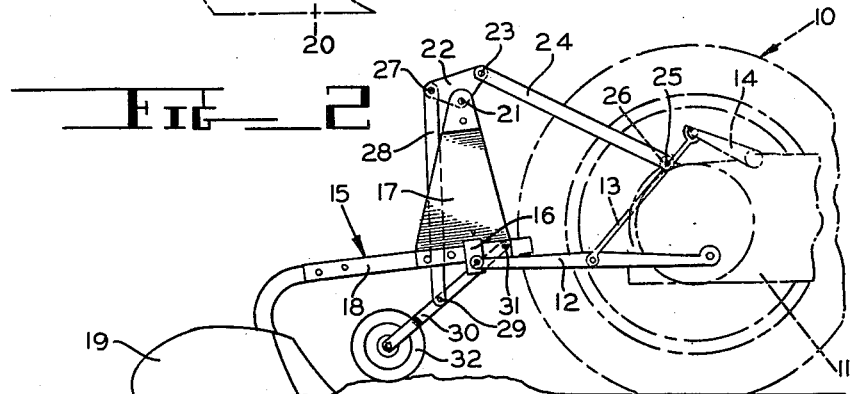
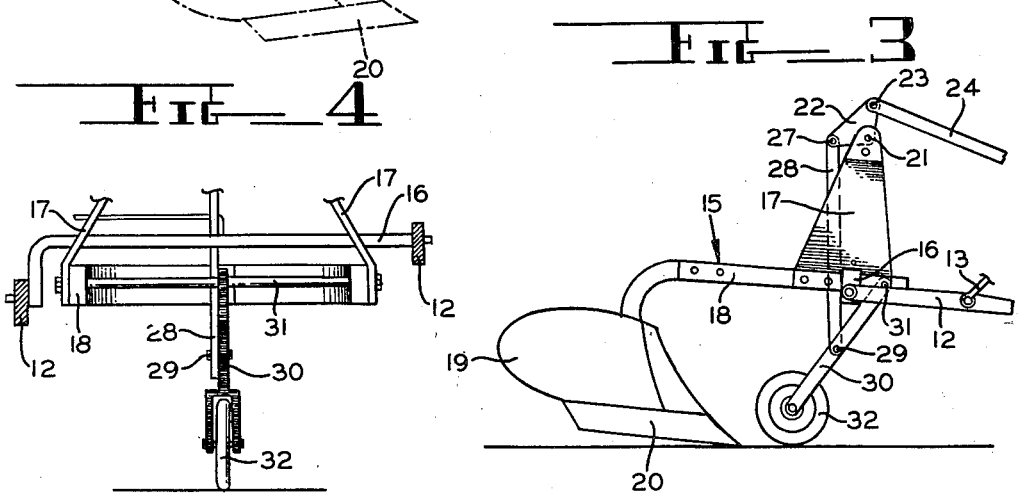
*INVENTOR.*
RAYMOND W. WILSON
BY *H P Settle, Jr.*
ATTORNEY

United States Patent Office 2,704,015  
Patented Mar. 15, 1955

2,704,015
PLOW POINT PITCH CONTROL

Raymond W. Wilson, Ferndale, Mich., assignor, by mesne assignments, to Ford Motor Company, Dearborn, Mich., a corporation of Delaware Application April 3, 1953, Serial No. 346,708

1 Claim. (Cl. 97—46.95)

The present invention relates to an implement pitch control and more particularly to a device for varying the pitch of a tractor-mounted implement in accordance with operating conditions under which the implement is used.

In the earlier filed application of Ralph C. Frevik and myself, Serial Number 267,794, filed Juanary 23, 1953, we have proposed the use of a ground-engaging control element for actuating a draft-responsive tractor hydraulic system to control the depth of operation of a tractor-mounted implement. The present invention now provides means for controlling as implement, such as a moldboard plow, a middle buster, or the like, by varying the pitch of the implement as a consequence of the contour of the ground traversed by the implement. The device of the present invention is independent of the draft generated by the implement, and its affords means for maintaining a constant depth of operation without the use of complicated draft-responsive hydraulic lifting mechanisms.

Generally, the present invention contemplates a ground-engaging element, preferably in the form of a wheel, pivoted to the implement for relative vertical movement and a medially pivoted lever connected at one end to the ground-engaging element for movement in response to movement of the ground-engaging element. The lever is connected at its other end to a fixed point on the tractor. Movement of the lever in accordance with ground contour causes fore and aft movement of the lever medial pivot point, which preferably is located upon the upstanding implement A-frame to be rigid with the implement ground-engaging working parts. Thus, ground-following movement of the ground-engaging gauge element causes fore and aft tilting of the implement to vary the angle of attack of the implement relative to the ground.

It is, therefore, an important object of the present invention to provide an improved implement control device responsive to variations in ground contour.

Another object is the provision of a device for controlling the pitch of a ground-engaging implement in accordance with the contour of the ground traversed by the implement.

It is a further object to provide a control device for a tractor-mounted implement to maintain constant depth of implement operation independently of implement draft and in strict accordance with the contour of the ground upon which the implement is operating.

Still another important object is the provision of a pitch control for a tractor-mounted implement by tilting the implement in accordance with vertical movement of a ground-engaging gauge element.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side view of a tractor (shown in dotted outline) and an implement provided with an implement pitch control of the present invention;

Figure 2 is a view similar to Figure 1 illustrating the pitch control in an adjusted position;

Figure 3 is a fragmentary view similar to Figures 1 and 2 in which the pitch control is illustrated in another adjusted position assumed as the implement enters the ground; and Figure 4 is a sectional view taken along the plane 4—4 of Figure 1.

As shown on the drawings:

In Figure 1, reference numeral 10 refers generally to a tractor having a rear axle housing 11 to which is universally connected the forward ends of a pair of trailing tractor draft links 12. The draft links are power liftable through lift arms 13 pivoted to the draft links and to a pair of upper lock arms 14 actuatable by the usual tractor hydraulic system to position the draft links and an implement carried thereby.

The implement 15 is illustrated as being a moldboard plow, although it will be appreciated that the pitch control of the present invention may be applied to a variety of soil working implements, such as middle busters, listers, cultivators, and the like. The implement 15 includes a cross-shaft 16 joining the draft links 12 and carried by an upstanding implement A-frame 17 defined by a pair of upwardly convergent side plates. The A-frame 17 is rigidly secured to a plow beam 18 which carries a plow base 19 having a lower share 20. The A-frame 17 is provided at its upper end with an attachment pivot pin 21 pivotally mounting a bell-crank lever 22 of generally triangular shape. It will be noted that the pin 21 serves to medially pivot lever 22 in vertically spaced relation to the pivotal connection point of the links 12 through the implement frame.

The upper end of the lever 22 is pivoted, as at 23, to a top link 24 which projects forwardly of the implement for pivotal connection, as at 25, to a fixed upstanding projection 26 on the tractor. The other end of the lever 22 is connected by pivot pin 27 to a depending actuating link 28 connected at its lower end at 29 to a generally trailing arm 30. The arm 30 is pivotally connected to the implement frame, as upon pivot rod 31 (Figure 4), and the lower end of the arm journals a ground-engaging element 32 preferably in the form of a wheel.

The ground-engaging wheel 32 is positioned immediately above the point of the share 20 and in substantial longitudinal alignment therewith. Since the wheel is freely pivotal about the rod 31 and at least a portion of the weight of the implement rest upon the wheel, the wheel is free to follow the contour of the ground traversed by the implement during implement operation. As illustrated in Figure 2, the wheel in passing over a ridge or bump in the ground exerts a compressive force upon the depending link 28 forcing the rear end of the lever 22 upwardly. The compressive forces will be transmitted through the lever 22 to the link 24, but since the link 24 is connected to a fixed portion 25 of the tractor, the pivot point 23 will remain stationary. Thus, the lever must rotate about the pivot point 23 and the pivot point 21 interconnecting the implement frame 17 and the lever 22 will be forced rearwardly, causing the implement frame to be tilted upwardly at its forward end. Since the plow base 19 is rigid with the implement frame, the plow point 20 will be directed upwardly by movement of the implement frame and beam about the pivot connection of the lower links 12 and the cross-shaft 15.

As illustrated in Figure 3, as the wheel 32 is lowered from its position of Figure 1, the plow beam is tilted downwardly at its front end, since once again the lever 22 must pivot about the point 23. Thus, the plow will enter the ground point first since the share will be tipped downwardly as illustrated.

The pitching of the implement thus also results from elevating and lowering the draft links 12 by operation of the tractors hydraulic system since only relative implement frame-ground wheel movement is required to effect tilting of the implement frame.

Thus it will be appreciated that the present invention provides a new and novel control device which is particularly adapted for tractor mounted implements. The device is operable for maintaining constant depth of operation despite the ground contour traversed by the implement. Further, the implement is pitched or directed in such a manner as to maintain a constant depth of operation, thus eliminating the necessity of bodily moving the implement upon actuation of the hydraulic system.

It will, of course, be understood that various details of construction may be varied through a wide range without departing from the principles of this invention and it is, therefore, not the purpose to limit the patent granted hereon otherwise than necessitated by the scope of the appended claim.

I claim:

A control device for a tractor-mounted plow having a share point and a rigid upstanding frame pivotally connected at its lower end to a tractor-mounted draft link, comprising a lever medially pivoted to an upper portion of said frame, a forwardly projecting top link pivoted to the tractor and to one end of said lever, a ground-engaging element pivoted to said frame to follow the contour of ground traversed by said plow, and means interconnecting said element and the other end of said lever, vertical movement of said element causing pivotal movement of said lever about its point of connection to said top link, thereby causing said medial pivot point to pivot thereabout to vary the inclination of said plow frame and the pitch of said plow share point.

References Cited in the file of this patent

UNITED STATES PATENTS

| | | |
|---|---|---|
| 1,637,811 | Ferguson | Aug. 2, 1927 |
| 2,621,575 | Berg | Dec. 16, 1952 |
| 2,622,499 | Fraga | Dec. 23, 1952 |